United States Patent Office

3,558,665
Patented Jan. 26, 1971

3,558,665
EPOXIDIZED PEROXIDES
Ronald L. Friedman and Roger N. Lewis, Pinole, Calif., assignors to Argus Chemical Corporation, a corporation of Delaware
No Drawing. Filed Mar. 3, 1966, Ser. No. 531,370
Int. Cl. C07c *73/00, 73/02*
U.S. Cl. 260—348                                26 Claims

ABSTRACT OF THE DISCLOSURE

Acyl peroxides containing epoxy groups that are provided by the conversion of carbon-to-carbon double bonds in ethylenically unsaturated peroxide intermediates to the corresponding epoxidized structures. The epoxy peroxides are useful as catalysts, for example, in the preparation of epoxy resins.

---

The present invention relates to a new class of epoxidized acyl peroxides prepared from corresponding ethylenically unsaturated acyl peroxides.

The peroxides of this invention have special utilities by reason of their unusual chemical structures. The foremost of these results from the epoxy groups. Having both peroxy and epoxy groups, these new compounds are unique in that they are capable of both catalyzing and cross-linking with, for example, epoxy resins. In other applications, the presence of epoxy groups, which may be derived by oxidizing ethylenically unsaturated peroxides as disclosed hereinafter, contributes the advantageous properties of an acid scavenger and stabilizer to the epoxidized derivatives. Heretofore, it has been necessary to introduce acid scavengers and reaction stabilizers as separate additives to neutralize the acidic environment required during polymerization, for example, of vinyls. When employing the epoxy peroxides of this invention as catalysts, it is necessary to add little or none of such compounds.

Additionally, glycol-containing peroxides are now obtainable by merely hydrolyzing the epoxy peroxides of this invention in the presence of water and an acid. Heretofore, it has not been possible to obtain such glycols. If the hydroxy radicals are initially present in the reactants used for the preparation of the present peroxides, they will esterify or otherwise react so that the end product will not be a glycol. With the present compounds, the glycol can be formed after the compound is made and therefore is not involved in the preparative reaction of the peroxide.

Unsaturated polyfunctional peroxides, precursors for certain of the epoxy peroxides of this invention, are disclosed in co-pending U.S. patent application Ser. No. 531,352, filed Mar. 3, 1966 and now abandoned.

Broadly, the polyfunctional epoxy peroxides of this invention are defined by the following structural formula:

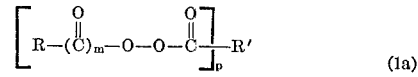  (1)

wherein *m* and *n* are positive whole number integers from 0 to 1 with the proviso that the sum of *m* and *n* is always at least 1 and *p* is a positive whole number integer from 1 to 2. R is a phenyl radical or a saturated or ethylenically unsaturated organic radical having acyclic or cyclic configuration and which may or may not contain one or more epoxy groups. R' is selected from a saturated organic acyclic or cyclic monovalent or bivalent radical, an unsaturated monovalent or bivalent radical having acyclic or cyclic configuration, a bivalent phenylene radical, an ethylenically unsaturated bivalent acyclic organic radical which may or may not contain one or more epoxy groups; and an acetylenically unsaturated acyclic bivalent radical. It is provided that either R or R' will always contain at least one epoxy grouping. On the other hand, when R and R' are acyclic each may contain more than one epoxy grouping.

Thus, when *n* is 1, *m* can be either 0 or 1 and the epoxy peroxides of this invention are defined by the following structural formula

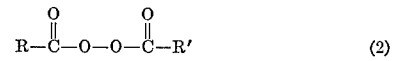  (1a)

wherein *m, p*, R and R' are defined supra.

When *m, n* and *p* are 1, 0 and 1, respectively, R' is epoxy free, monovalent and saturated and R is a saturated epoxy-containing organic radical having acyclic or cyclic configuration. When *m, n* and *p* are 1, 0 and 2, respectively, R' is bivalent and either saturated or acetylenically unsaturated, the R radical again containing the epoxy grouping.

When *m* is 0, R is saturated organic radical and is preferably of a tertiary configuration.

When *m, n* and *p* are 0, 1 and 2, respectively, R' is an epoxy-containing, saturated, bivalent radical having cyclic or acyclic configuration and R is epoxy free. When *m* and *n* are both 1, irrespective of whether *p* is 1 or 2, it is preferred that the R(s) and R' each contain an epoxy grouping.

In a further preferred aspect, R and R' are limited to less than 20 carbon atoms each. Although it is desirable that both R and R' be hydrocarbons prior to epoxidation, non-hydrocarbon substituents may be included, provided they produce no undesirable side effects.

The epoxidized peroxides defined by this invention, therefore, include (1) those diacyl peroxides having the following structural formula:

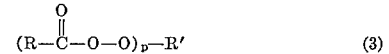  (2)

wherein R and R' are similar or dissimilar saturated mono or poly epoxy-containing organic groups as defined supra when *m, n* and *p* are each 1; and (2) those peresters having the following structural formula:

$$(R-\overset{O}{\underset{\|}{C}}-O-O)_p-R'$$  (3)

wherein *p* and R are defined as set forth supra. When it is desirable to locate the epoxy group contained in the R radical at the α,β position relative to the carbonyl group, special techniques known in the art for epoxidation at such a location may be required.

With respect to Formula 3, when *p* is 1, R' is a monovalent saturated organic radical, while when *p* is 2, R' is either a bivalent saturated or acetylenically unsaturated organic radical.

Representative examples of epoxy peroxides within the scope of this invention include the following:

Acetyl-9,10-epoxy stearoyl peroxide

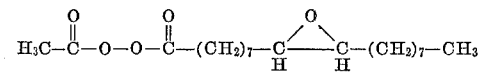

Bis (9,10-epoxy stearoyl) peroxide

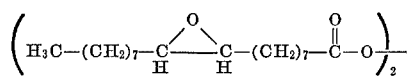

Benzoyl-9,10-epoxy stearoyl peroxide

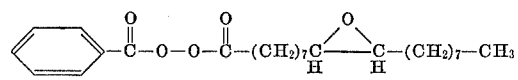

Bis (3,4-epoxy tetrahydrobenzoyl) peroxide

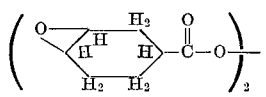

Decanoyl-3,4-epoxy terahydrobenzoyl peroxide

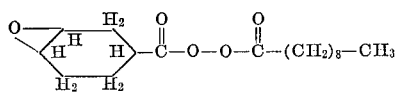

t-Butyl per 3,4-epoxy tetrahydrobenzoate

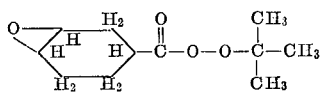

9,10-epoxy 12-octadecenoyl-3,4-epoxy tetrahydrobenzoyl peroxide

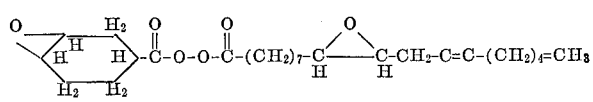

t-Butyl per 9,10-epoxy stearate

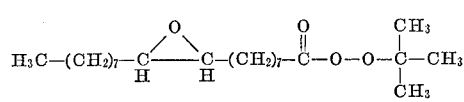

9,10-epoxy stearoyl-3,4-epoxy tetrahydorbenzoyl peroxide

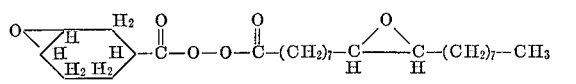

2,5 - dimethyl-2,5-diper (3,4-epoxy tetrahydrobenzoate) hexyne-3

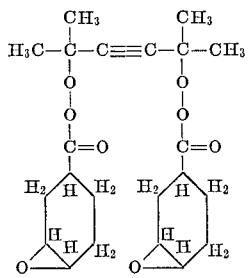

Di-t-butyl per 4,5-epoxy tetrahydro phthalate

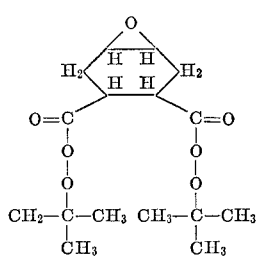

2,5 - dimethyl - 2,5 - diper (3,4-epoxytetrahydrobenzoate) hexane

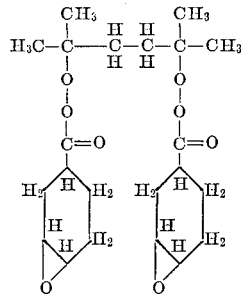

Di (3,4-epoxytetrahydrobenzoyl)) epoxy succinoyl peroxide

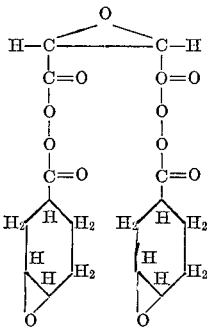

Crotonyl-3,4-epoxy tetrahydrobenzoyl peroxide

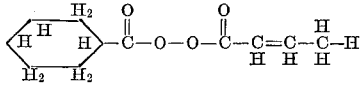

Di (3,4-epoxy tetrahydrobenzoyl) phthaloyl peroxide

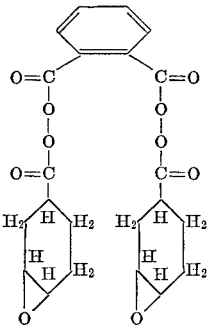

Di (3,4-epoxy tetrahydrobenzoyl) 4,5-epoxy tetrahydro phthaloyl peroxide

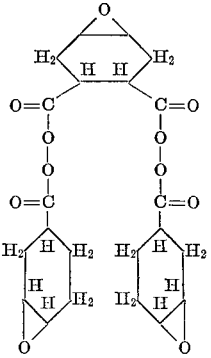

9,10-12,13-diepoxy stearoyl-3,4-epoxy tetrahydrobenzoyl peroxide

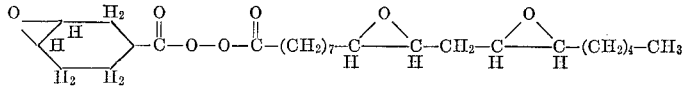

t-Butyl per 2,3-epoxy n-butyrate

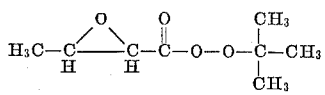

Di-benzoyl epoxy succinoyl peroxide

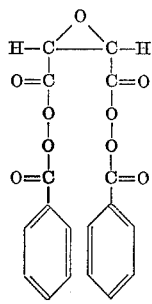

Di (3,4-epoxy tetrahydrobenzoyl) maleoyl peroxide

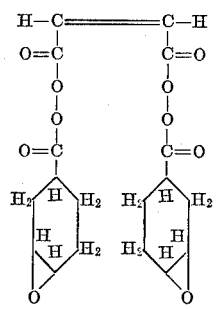

The novel epoxy peroxides of this invention are the products of oxidation of ethylenically unsaturated peroxide intermediates wherein the double bond

converted to an epoxy

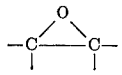

grouping through any standard epoxidation reaction employing active oxygen agents such as peracetic acid, hydrogen peroxide/acetic acid with an acid catalyst, hydrogen peroxide/formic acid without an acid catalyst and the like.

Additionally, through careful control of the amount of active oxygen agent employed, partially epoxidized materials such as set forth supra are obtained. For example, in linoleoyl tetra hydrobenzoyl peroxide, by selective addition of the epoxidizing agent, the double bond located at the 9,10 position will be substantially completely converted to an epoxy group while leaving unsaturation in the 12,13 position and in the cyclohexenoyl ring. Such compounds have the desirable feature of combining unsaturation for cross-linking reactions with unsaturated monomers and polymers, and stabilization of the finished polymer with epoxy groups.

The ethylenically unsaturated organic peroxides, precursors employed in the preparation of the epoxy peroxides of this invention may be obtained by the conventional techniques generally known to one skilled in the art.

PERESTERS

In the preparation of an ethylenically unsaturated perester (or diperester), conventional techniques include the reaction of a hydroperoxide (R'—O—O—H) of the desired hydroxy (or dihydroxy) alkane or alkyne with an ethylenically unsaturated carboxylic acid (R—COOH), wherein the organic radical (R) corresponds to the ethylenically unsaturated organic group desired in the ethylenically unsaturated perester precursor. In such reactions it is normally preferred to employ an acid halide, such as a chloride, of the corresponding unsaturated carboxylic acid in the reaction with the hydroperoxide to form the ester.

The preparation of an ethylenically unsaturated perester is illustrated by the following incomplete equation:

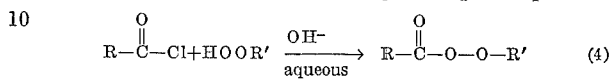

This type of reaction is exemplified by the preparation of t-butyl per tetrahydrobenzoate:

A mixture of 250 ml. of water and 1.13 moles of 50% NaOH was cooled to 10° C. 0.50 mole of t-butyl hydroperoxide was added to the stirred caustic solution. The mixture was then cooled to 0° C. and Triton X-100 and petroleum naphtha were added to the reactor. Thereafter, 0.75 mole of 3,4-tetrahydrobenzoyl chloride was added over 32 minutes at 0 to 2.5° C. The mixture was stirred for another two hours at these temperatures, and after the reaction was complete, was separated. The organic layer was washed twice with cold, dilute KOH solution (pH 11), twice with cold water, once with dilute cold $H_2SO_4$ solution (pH 1) and once more with cold water. The washes were all carried out at 10 to 15° C. with 15 minutes of stirring. The product was dried with anhydrous $Na_2SO_4$, filtered, and concentrated under vacuum. The product analysis was as follows: active oxygen—theoretical 8.07; actual—7.64; purity of final product 94.7%; yield, percent of theoretical 87.6%.

In similar procedures, ethylenically unsaturated peresters such as t-butyl per oleate are prepared. Furthermore, by varying the stoichiometric quantities of the appropriate hydroperoxide and acid halide 2,5-dimethyl-2,5-dipertetrahydrobenzoate hexyne-3 and 2,5-dimethyl-2,5-diper tetrahydrobenzoate hexane are prepared.

UNSYMMETRICAL DIACYLS

The preparation of unsymmetrical ethylenically unsaturated diacyl peroxides is conventionally accomplished by reacting the peracid of one of the desired constituents with an acid halide, preferably an acid chloride, of the other desired acyl constituent, as illustrated by the following incomplete equation:

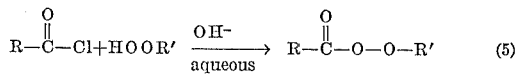

This reaction is exemplified by the preparation of acetyl oleoyl peroxide:

A mixture of 1.0 mole of aqueous 32.66% peracetic acid (PAA) solution (mole ratio PAA/AA was 1.95) was cooled to 0° C. Sufficient $Na_2CO_3$ was added to neutralize the acetic acid (AA) present. Then 0.9 mole of oleoyl chloride and 1.0 mole of 50% NaOH were added simultaneously over 24 minutes at from about −2 to 0° C. The reaction was completed and worked up. The product analysis was as follows: active oxygen—theoretical 4.70; actual—4.06; purity of product—86.2%; yield, percent of theoretical—79.2%.

Here again, by varying the reactants and the stoichiometric quantities present, unsymmetrical ethylenically unsaturated diacyl peroxide such as decanoyl tetrahydrobenzoyl peroxide, di (tetrahydrobenzoyl) maleoyl peroxide, benzoyl oleoyl peroxide, di (tetrahydrobenzoyl) phthaloyl peroxide, di (tetrahydrobenzoyl) tetrahydro phthaloyl peroxide, oleoyl tetrahydrobenzoyl peroxide, oleoyl linoleoyl peroxide, crotonyl tetrahydrobenzoyl peroxide and tetrahydro benzoyl linoleoyl peroxide are prepared.

SYMMETRICAL DIACYL

The symmetrical ethylenically unsaturated diacyl peroxides are generally prepared by reacting an acid chloride with hydrogen peroxide in the presence of a base. For example, bis (tetrahydrobenzoyl) peroxide is prepared as follows:

A mixture of 0.55 mole of 50% HOOH and 200 ml. water were cooled to 2° C. 1.75 moles of 50% NaOH was added thereto over a 9 minute period. The temperature rose to 14° C. Triton X-100 was added to emulsify the mixture. The mixture of 1.0 mole of tetrahydrobenzoyl chloride and 100 ml. of petroleum naptha were added over 35 minutes at from −1 to 1° C. The reaction was stirred for an additional 2.5 hours at 0 to 2° C. After the reaction was finished, it was phase separated. The organic layer was washed three times with dilute KOH solution (pH 11) and once more with water. The product was dried with anhydrous $Na_2SO_4$ and filtered. The active

TABLE I.—EPOXIDIZED PEROXIDES

| Starting peroxide | Percent purity by active oxygen | Peroxide made | Percent PAA used | Mole ratio PAA/AA | Mole ratio PAA/peroxide | Reaction temp., °C. | Reaction time, hrs. | $N_D^{25}$ product |
|---|---|---|---|---|---|---|---|---|
| Acetyl oleoyl | 91.0 | Acetyl epoxy stearoyl | 24.60 | 2.58 | 1.25/1 | 30–24.5 | 17⅔ | 1.4552 |
| Oleoyl | 93.0 | Epoxy stearoyl | 24.14 | 2.38 | 1.25/1 | 46–52 | 3 | 1.4620 |
| Benzoyl oleoyl | 90.1 | Benzoyl epoxy stearoyl | 23.90 | 2.29 | 1.25/1 | 31–26 | 17⅔ | 1.4892 |
| Tetrahydro benzoyl | [1] 63.7 | Bis 3,4-epoxy tetrahydro benzoyl | 23.46 | 2.14 | 3.00/1 | ca. 7 | ca. 99 | |
| Decanoyl tetrahydro benzoyl | 88.3 | Decanoyl 3,4-epoxy tetrahydro benzoyl | 23.46 | 2.14 | 3.00/1 | ca. 7 | ca. 101 | 1.4597 |
| t-Butyl per tetrahydro benzoate | 94.7 | t-Butyl per 3,4-epoxy tetrahydro benzoate | 23.23 | 2.06 | 1.50/1 | 33–25 | 17⅔ | 1.4648 |
| 2,5-dimethyl-2,5-dipertetrahydrobenzoate hexyne-3. | 90.3 | 2,5-dimethyl-2,5-diper 3,4-epoxy tetrahydro benzoate hexyne-3. | 24.03 | 2.44 | [2] 1.50/1 | 30–25 | 17⅔ | 1.4867 |

| Peroxide made | Analysis of product oxirane oxygen analysis | | | Active oxygen analysis | | | Percent yield | Percent yield based on which analysis |
|---|---|---|---|---|---|---|---|---|
| | Percent theory | Percent found | Percent purity | Percent theory | Percent found | Percent purity | | |
| Acetyl epoxy stearoyl | 4.49 | 4.33 | 96.4 | 4.49 | 3.99 | 88.9 | 92.7 | Active oxygen. |
| Epoxy stearoyl | 5.38 | 4.87 | 90.4 | 2.69 | 2.42 | 89.6 | 84.2 | Oxirane oxygen. |
| Benzoyl epoxy stearoyl | 3.82 | 3.63 | 95.0 | 3.82 | 3.58 | 93.8 | 97.5 | Active oxygen. |
| Bis 3,4-epoxy tetrahydro benzoyl | 11.34 | 5.83 | 51.4 | 5.67 | 3.24 | 57.2 | 34.7 | Oxirane oxygen. |
| Decanoyl 3,4-epoxy tetrahydro benzoyl | 5.12 | 3.75 | 73.2 | 5.12 | 4.92 | 96.1 | 70.5 | Oxirane oxygen. |
| t-Butyl per 3,4-tetrahydro benzoate | 7.47 | 6.83 | 91.4 | 7.47 | 7.23 | 96.8 | 96.6 | Oxirane oxygen. |
| 2,5-dimethyl-2,5-diper (3,4-epoxy tetrahydro benzoate) hexyne-3. | 7.57 | 6.87 | 90.8 | 7.57 | 6.30 | 83.2 | 81.7 | Oxirane oxygen. |

[1] In DMP.
[2] Also done at 3.00/1 with about the same results as described.

oxygen analysis of the product was as follows: theoretical—6.39; actual—2.38. The purity and yield were 37.3% and 75.6%, respectively. Because this peroxide was found to be heat unstable, dimethyl phthalate (DMP) was added and the petroleum naptha stripped off under vacuum and the product analyzed as follows: actual active oxygen—4.07; purity—63.7%.

Here again, bis oleoyl peroxide is prepared in a similar manner.

To further illustrate the novel epoxy peroxides of this invention, the following examples are provided. It should be understood that the details thereof are not to be regarded as limitations as they may be varied as will be understood by one skilled in this art.

To individual reaction vessels containing peracetic acid in acetone were added 1.0 mole of various ethylenically unsaturated peroxides. The specific peroxides treated and the reaction conditions employed are shown in Table I. The reactions were warmed to the desired temperature using a water bath. A condenser was used to prevent loss of peracetic acid and acetone.

After the reactions were completed, the reaction products were diluted with water and some solvent, shaken, and phase separated. The organic layers were washed twice with 0.5% KOH in 5% $Na_2SO_4$ solution and twice with water. The products were dried with anhydrous $Na_2SO_4$, filtered and concentrated under vacuum.

Table I contains an analysis of the results, as well as the specific reaction conditions employed for obtaining the various epoxy peroxides.

Other epoxidized peroxides of this invention such as t-butyl per 9,10-epoxy stearate, 9,10-epoxy stearoyl-3,4-epoxy tetrahydrobenzoyl peroxide, 2,5-dimethyl-2,5-diper (3,4-epoxy tetrahydrobenzoate) hexane, di (3,4-epoxy tetrahydrobenzoyl) epoxy succinoyl peroxide, di (3,4-epoxy tetrahydrobenzoyl) phthaloyl peroxide, di (3,4-epoxy tetrahydrobenzoyl) 4,5-epoxy tetrahydro phthaloyl peroxide, benzoyl -9,10-12,13-diepoxy stearoyl peroxide, benzoyl -9,10-12,13-15,16-triepoxy stearoyl peroxide, crotonyl-3,4-epoxy tetrahydrobenzoyl peroxide, oleoyl-9,10-epoxy 12-octadecenoyl peroxide, 3-cyclohexenoyl 9,10-epoxy 12-octadecenoyl peroxide and the like are prepared in the same manner.

Although the foregoing invention has been described in some detail by way of illustration and example for purposes of clarity of understanding, it is understood that certain changes and modifications may be practiced within the spirit of the invention as limited only by the scope of the appended claims.

What is claimed:
1. An epoxidized peroxide consisting of carbon, hydrogen and oxygen atoms and having the formula:

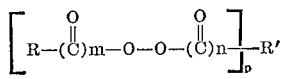

wherein
m and n are positive whole number integers of from 0 to 1 with the proviso that the sum of m and n is always at least 1, p is a positive whole number integer of from 1 to 2,
R is an organic radical less than 20 carbon atoms selected from the group consisting of a phenyl radical, an ethylenically unsaturated monovalent organic radical having acyclic or cyclic configuration, or a saturated monovalent organic radical having acyclic or cyclic configuration,
R' is an organic radical of less than 20 carbon atoms selected from the group consisting of a saturated monovalent acyclic, saturated bivalent acyclic, bivalent phenylene, monovalent saturated cyclic, monovalent ethylenically unsaturated acyclic, monovalent ethylenically unsaturated cyclic, bivalent ethylenically unsaturated acyclic, bivalent saturated cyclic, and bivalent acetylenically unsaturated acyclic with the proviso that each oxygen atom present in R or R' is in the form of an epoxy grouping and that at least one epoxy grouping is always present in at least one R or R', when R is a phenyl group m and n=1, when m=0, R is free from epoxy groups, and when n=0, R' is saturated or acetylenically unsaturated and free from epoxy groups and R is a saturated monovalent radical having acyclic configuration.

2. An epoxidized acyl peroxide in accordance with claim 1 wherein $p$ is 1, $m$ is 1 and $n$ is 1.

3. An epoxidized peroxide in accordance with claim 1 wherein $p$ is 1, $m$ is 1 and $n$ is 0.

4. An epoxidized peroxide in accordance with claim 1 wherein $p$ is 2, $m$ is 1 and $n$ is 0.

5. An epoxidized peroxide in accordance with claim 1 wherein $p$ is 2, $m$ is 1 and $n$ is 1.

6. An epoxidized peroxide in accordance with claim 1 wherein $p$ is 2, $m$ is 0 and $n$ is 1.

7. An epoxidized peroxide in accordance with claim 2 wherein both R and R' are 8,9-epoxy heptadecanyl radicals.

8. An epoxidized peroxide in accordance with claim 2 wherein R is an 8,9-epoxy heptadecanyl radical and R' is a methyl radical.

9. An epoxidized peroxide in accordance with claim 2 wherein R is a phenyl radical and R' is an 8,9-epoxy heptadecanyl radical.

10. An epoxidized peroxide in accordance with claim 2 wherein R is a 3,4-epoxy cyclohexanyl radical and R' is a nonanyl radical.

11. An epoxidized peroxide in accordance with claim 2 wherein both R and R' are 3,4-epoxy tetrahydrobenzoyl radicals.

12. An epoxidized peroxide in accordance with claim 2 wherein R is a 3,4-epoxy cyclohexanyl radical and R' is an 8,9-epoxy heptadecanyl radical.

13. An epoxidized peroxide in accordance with claim 2 wherein R is a 3,4-epoxy cyclohexanyl radical and R' is 1-propenyl radical.

14. An epoxidized peroxide in accordance with claim 3 wherein R is a 3,4-epoxy cyclohexanyl radical and R' is a t-butyl radical.

15. An epoxidized peroxide in accordance with claim 3 wherein R is a 1,2-epoxy propanyl radical and R' is a t-butyl radical.

16. An epoxidized peroxide in accordance with claim 3 wherein R is an 8,9-epoxy heptadecanyl radical and R' is a t-butyl radical.

17. An epoxidized peroxide in accordance with claim 4 wherein the Rs are 3,4-epoxy cyclohexanyl radicals and R' is a 2,5-dimethyl hex-2,5-ylene radical.

18. An epoxidized peroxide in accordance with claim 4 wherein the Rs are 3,4-epoxy cyclohexanyl radicals and R' is a 2,5-dimethyl, hex-3-yne-2,5-ylene radical.

19. An epoxidized peroxide in accordance with claim 5 wherein the Rs are 3,4-epoxy cyclohexanyl radicals and R' is an epoxy ethylene radical.

20. An epoxidized peroxide in accordance with claim 5 wherein the Rs are 3,4-epoxy cyclohexanyl radicals and R' is a 1,2-benzenylene radical.

21. An epoxidized peroxide in accordance with claim 5 wherein the Rs are phenyl radicals and R' is an epoxy ethylene radical.

22. An epoxidized peroxide in accordance with claim 5 wherein the Rs are a 3,4-epoxy cyclohexanyl radical and R' is a 4,5-epoxy cyclohexan-1,2-ylene radical.

23. An epoxidized peroxide in accordance with claim 5 wherein the Rs are 3,4-epoxy tetrahydrobenzoyl radicals and R' is an ethenylene radical.

24. An epoxidized peroxide in accordance with claim 6 wherein the Rs are t-butyl radicals and R' is a 4,5-epoxy cyclohexan-1,2-ylene radical.

25. An epoxidized peroxide in accordance with claim 2 wherein R is a 3,4-epoxy cyclohexanyl radical and R' is a 8,9-11,12-diepoxy heptadecanyl radical.

26. An epoxidized peroxide of the formula:

$$\left[ R-(\overset{O}{\underset{\|}{C}})_m-O-O-(\overset{O}{\underset{\|}{C}})_n- \right]_p R'$$

wherein $m$ and $n$ are positive whole number integers of from 0 to 1 with the proviso that the sum of $m$ and $n$ is always at least 1;

$p$ is a positive whole number integer of from 1 to 2; and R and R' are each organic radicals of less than 20 carbon atoms, and being free of other than carbon, hydrogen and oxygen atoms, with the proviso that any oxygen present is in the form of an epoxy group, with the further proviso that at least one epoxy group is always present in at least one R or R'; when $p$ is 1, R' is monovalent and when $p$ is 2, R' is bivalent, when $m$ is 0, R is free from epoxy groups and when $n$ is 0, R' is free from epoxy groups.

References Cited
UNITED STATES PATENTS

| | | | |
|---|---|---|---|
| 3,238,227 | 3/1966 | Tinsley et al. | 260—348 |
| 2,786,067 | 3/1957 | Frostick et al. | 260—348 |

NORMA S. MILESTONE, Primary Examiner

U.S. Cl. X.R.

260—2, 610